Nov. 27, 1923.  1,475,453
H. SHINN
ADJUSTABLE GUIDE FOR CROSSHEADS OF LOCOMOTIVES AND THE LIKE
Filed March 25, 1922
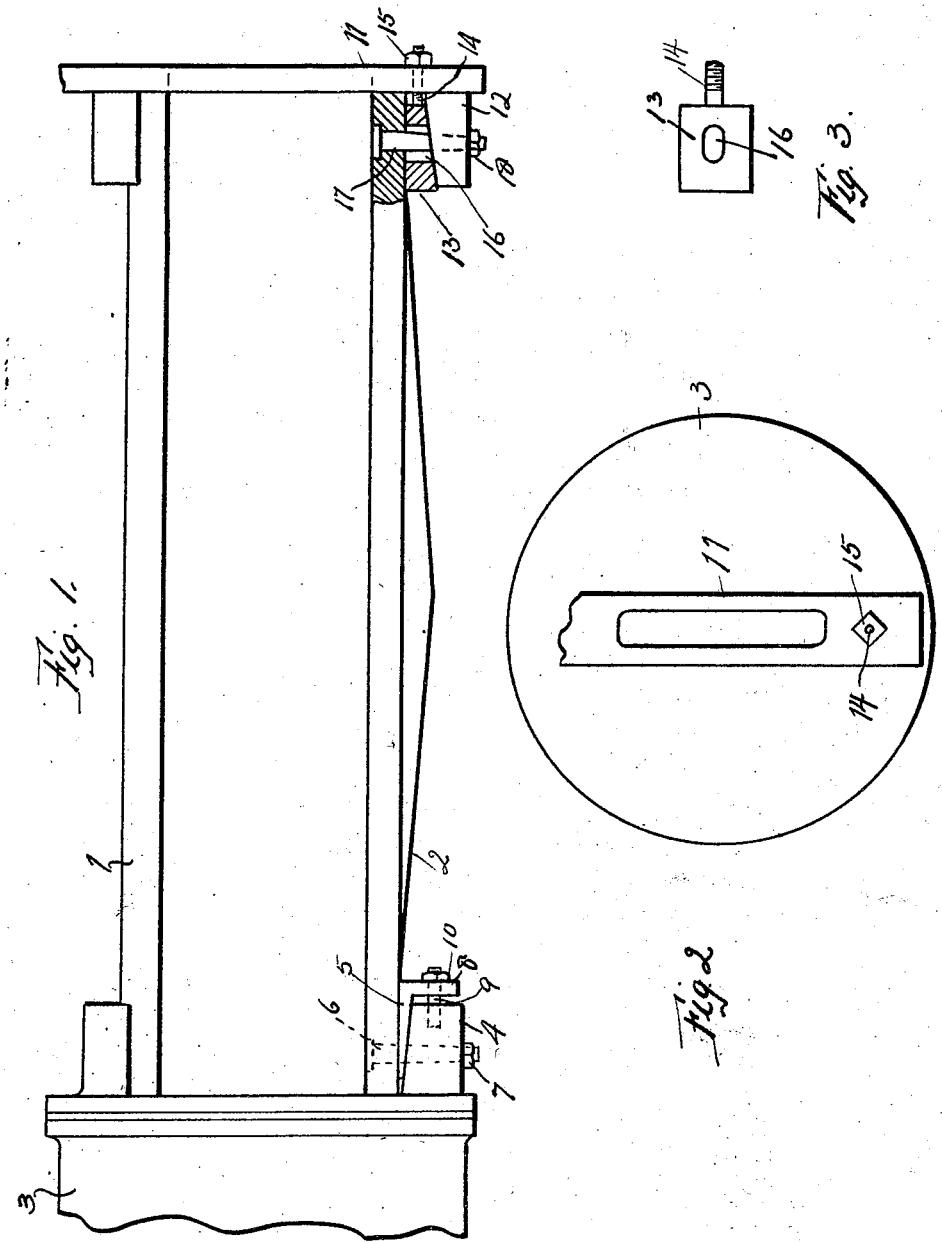
Inventor
Horace Shinn
By W. W. Williamson Atty Patented Nov. 27, 1923.

1,475,453

UNITED STATES PATENT OFFICE.

HORACE SHINN, OF MAPLE SHADE, NEW JERSEY.

ADJUSTABLE GUIDE FOR CROSSHEADS OF LOCOMOTIVES AND THE LIKE.

Application filed March 25, 1922. Serial No. 546,659.

*To all whom it may concern:*

Be it known that I, HORACE SHINN, a citizen of the United States, residing at Maple Shade, in the county of Burlington and State of New Jersey, have invented new and useful Improvements in Adjustable Guides for Crossheads of Locomotives and the like, of which the following is a specification.

My invention relates to a new and useful improvement in adjustable guides for the cross heads of locomotives and the like, and has for its object to provide an exceedingly simple and effective construction and arrangement of the parts by which the lower guide may be accurately within certain limitations to compensate for wear.

A further object of my invention is to so construct the adjusting members that they may be firmly held against accidental displacement after being set.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of the cross head guides of a locomotive, a portion thereof being broken away to illustrate the construction of my invention.

Fig. 2, is an end view.

Fig. 3, is a detail view of one of the adjusting slides.

In carrying out my invention as here embodied, 1 represents the upper and 2 the lower cross head guides, the upper guide being made stationary relative to the cylinder 3 and the framework of the locomotive, while the guide 2 is made adjustable in the following manner.

Projecting from the cylinder head is a supporting block 4 and 5 is a wedge shaped slide which is superimposed upon said block the upper surface of which latter is inclined to correspond with the wedge shaped surface of the slide and upon this slide the inner end of the lower guide 2 is supported. The guide is held in place relative to the block 4 by the tapered bolt 6 which passes through the guide, slide and block and has run upon its threaded end a nut 7 for drawing these parts firmly together and in practice one or more jamb nuts may be used to make these parts more secure.

The slide 5 has a depending heel 8 through which the stud bolt 9 passes said bolt being secured in the block 4 and upon the outer end of this bolt is threaded the nut 10 for adjusting the slide in any desired position, as will be readily understood.

11 represents the yoke which is supported in any suitable or well known manner upon the framework of the locomotive and has secured thereto the supporting block 12 the upper surface of which latter is beveled and upon this upper surface is placed the wedge shaped slide 13 having a threaded shank 14 which passes through the yoke 11 and has run thereon an adjusting nut 15. This slide has an elongated opening 16 therein for the passage of the tapered bolt 17 which latter also passes through the outer end of the guide 2 and the block 12 having its lower end threaded for the reception of the nut 18 whereby this outer end of the guide, the slide 13 and the block 12 may be firmly secured together.

By this arrangement it will be seen that the outer end of the guide 2 may be adjusted by backing off the nut 18 and manipulating the nut 15 to draw the wedge shaped slide 13 inward thereby slightly raising the outer end of the guide 2 to correspond with the adjustment of the inner end of said guide by means of the wedge shaped slide 5.

It is to be understood that the adjustable slides may be either in the form of 5 or 13 for either or both ends of the lower guide but in practice it will be found that 5 is the preferable form for a slide for the inner end of a guide while a slide in the form of 13 is preferable for the outer end of said guide although both have the same function.

From the foregoing description it will be obvious that when the cross head or guide wear this wear may be quickly and readily compensated for by loosening the nuts 7 and 18 and forcing the wedge shaped slides 5 and 13 in the direction which will tend to raise the ends of the guide 2 thereafter again binding the parts together by setting up upon the nuts 7 and 18.

This is of great advantage in railway operation since it obviates the necessity of jacking up the lower guide, the removal and replacement of shims and other inconveniences which are now attendant upon the adjustment of the lower cross head guide.

Of course I do not wish to be limited to the exact details of construction as herein shown as these may be varied within the limits of the appended claims without departing from the spirit of my invention.

Having thus fully described my invention, what I claim as new and useful is:—

1. In a device of the character described, two stationary supporting blocks, said blocks having their upper surfaces inclined, a wedge shaped slide superimposed upon each of said blocks, a cross head guide resting upon said slides, means for forcing the slides longitudinally of the guide whereby the latter will be raised, and means for securing the ends of the guide securely upon the slides.

2. In combination with a cross head guide, a stationary block located at each end of the guide, each of said blocks having an inclined upper surface, a wedge shaped slide superimposed upon each of said blocks and underlying opposite ends of the guide, means for adjusting said slides longitudinally, and means for clamping the cross head guide upon said slides.

3. The herein described combination of two spaced stationary blocks having inclined upper surfaces, a guide member movable relative to said blocks with the ends of the guide overlying said blocks, a wedge shaped slide interposed between each stationary block and an end of the guide whereby either end of said guide may be adjusted independent of the other through the movement of its respective slide to the means for moving the slides longitudinally of the guide, and means for clamping each slide between its respective block and an end of the guide.

In testimony whereof, I have hereunto affixed my signature.

HORACE SHINN.